June 8, 1943.  J. F. HENNESSY  2,321,141
HANDLE CONSTRUCTION FOR RANGES
Original Filed July 29, 1940
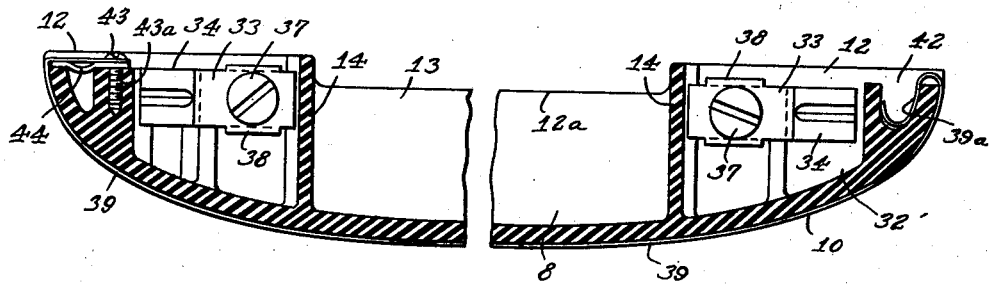
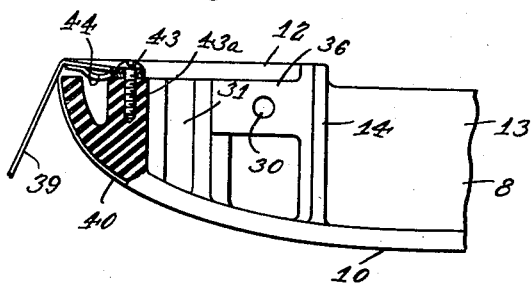
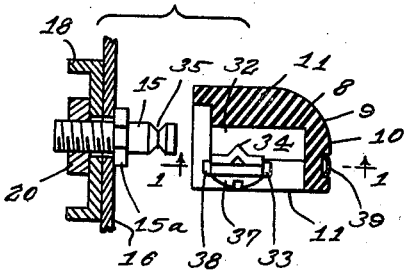
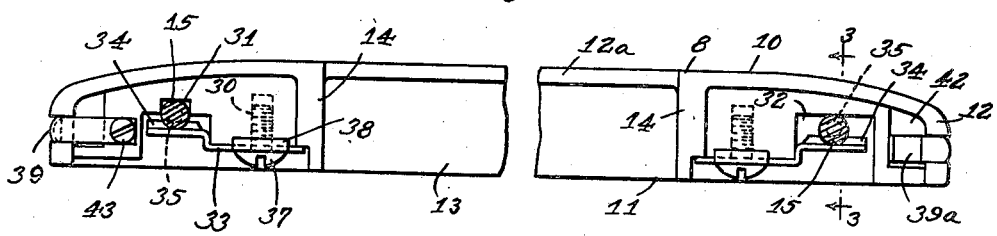
Inventor:
John F. Hennessy
By McCanna, Wintercorn & Morabach
Attys.

Patented June 8, 1943

2,321,141

UNITED STATES PATENT OFFICE 2,321,141

HANDLE CONSTRUCTION FOR RANGES

John F. Hennessy, Rockford, Ill., assignor to Geo. D. Roper Corporation, Rockford, Ill., a corporation of Illinois Original application July 29, 1940, Serial No. 348,126. Divided and this application May 31, 1941, Serial No. 396,023

8 Claims. (Cl. 41—35)

This invention relates to improvements in handles and this application is a division of a copending application Serial No. 348,126, filed July 29, 1940.

In the matter of handles for drawers and doors of cooking ranges and other cabinets, efforts have been directed toward making a handle that is convenient for grasping, attractive in appearance, and of such material that, when used on a cooking range, will not conduct heat to an objectionable degree. Plastic material such as that known as Plaskon and Beetle has been found to be desirable for these purposes. A problem, however, has arisen in connection with the use of such plastics on cooking ranges. Over a period of time a handle of this material undergoes a progressive shrinkage because of successive heating and cooling through intermittent use of the cooking range. During the heating, the plastic material expands, while upon cooling it shrinks not only to its original size but to a point beyond, measurements having shown that a shrinkage of one-eighth of an inch has been effected over a period. As a result, where the ornamental metal band is attached to the handle, the band becomes loose by reason of its different coefficient of expansion and the handle, therefore, presents an unworkmanlike and unattractive appearance. It is, therefore, the principal object of my invention to provide new and improved means for securing an ornamental metal band in a groove in a handle of the kind mentioned whereby the band is always kept taut under spring tension.

The invention is illustrated in the accompanying drawing in which—

Figure 1 is a horizontal section through a handle equipped with an ornamental metal band in accordance with my invention, this section being on the line 1—1 of Fig. 3;

Fig. 2 is a sectional detail corresponding to a portion of Fig. 1 but showing the spring tensioning means with the ornamental band loose and ready for application to the handle and with the stud clamp removed;

Fig. 3 is a section on the line 3—3 of Fig. 4, showing a handle and mounting stud in diassembled relation to indicate the mode of connection, and Fig. 4 is a rear elevation of a handle showing in section the studs for fastening the same.

The same reference numerals are applied to corresponding parts throughout the views.

While the invention is described with especial reference to application to cooking ranges, it should be evident that the same is applicable to cabinets generally and any other articles of furniture requiring handles.

The handle 8 is molded of a plastic composition material known to the trade as Plaskon or Beetle. The handle is of elongated form and has a rounded outer top edge 9 and longitudinally arched front surface 10. The bottom surface 11 is flat in a horizontal plane, and the back surface 12 is flat in a vertical plane. The handle is hollowed out as at 13 between parallel ribs 14 at the middle portion of the handle 8 for conveniently grasping it by entering one's finger tips into the bottom, the thumb being pressed against the top or front.

Each handle 8 is arranged to be mounted on studs 15 which project from an outer panel 16 of a door or drawer. The edge of the top wall of the handle is cut away as at 12a so that, when the handle is mounted, a slot is provided between the back of the handle and the front of the panel 16. This is not only of ornamental value but prevents excessive heating of the handle by thus insulating the middle grip portion of the handle from the range and permitting air to circulate therebetween. The studs 15 are anchored to the drawer 17 by being secured to a handle supporting bracket 18 of channel construction having cages for nuts 20 which draw shoulders 15a of the studs against the outer panel 16.

Recesses are provided in the end portions of each handle 8 for the reception of the studs 15, as disclosed in the parent application. One recess is in the form of a narrow groove 31 of approximately the width of the projecting end of the stud to prevent lateral movement, while the other recess is in the form of a wide channel wherein the other stud may assume any one of a series of positions in laterally spaced relation to one another, depending on the degree of expansion or contraction of the material of the handle. Sheet metal clamps 33 have end portions 34 of V-shaped section which are adapted to enter annular V-shaped grooves 35 in the ends of the studs 15 to fasten the handle detachably. The clamps 33 are secured to ribs 36 molded integral with the handle in transverse relation to the groove 31 and channel 32, screws 37 being entered through holes in the clamps into threaded holes 39 in the ribs to fasten the clamps. Side flanges 38 integral with the clamps 33 overlap the sides of the ribs 36 and prevent swiveling relative to the screws 37. The clamps 33, when the screws 37 are tightened, clamp the studs 15 resiliently in the groove 31 and channel 32. The V-shaped portions 34 of the clamp ride on the outer sides of the V-grooves 35 in the studs so as to cause the handle to be crowded into tight engagement with the panel 16. Provision of the channel 32 in which lateral movement of stud 15 is relatively unconfined permits maximum expansion and contraction of the handle 8 without any danger of breakage from stresses set up in the handle by the studs 15 which are spaced a fixed distance apart. It has been found sufficient to provide space for slidable movement of the stud 15 at only one end of the handle; consequently the groove 31 at the opposite end prevents relative lateral movement and contributes to the rigidity of the construction. To attach a handle 8, one merely loosens the clamp screws 37 and enters the studs 15 into the groove 31 and channel 32, so that the ends 34 of the clamps 33 enter the grooves 35, in which position the rear side of the handle abuts the outer panel 16. To complete the attaching operation, all that need be done is to tighten the screws 37 thereby tensioning the clamps 33 against the grooved ends of the studs 15. This tension maintains firm attachment of the handle to the drawer 17. To remove the handle all that is required is the loosening of the screws 38, whereupon the handle can be slipped off the studs 15.

In accordance with my invention, an ornamental metal band 39 of arcuate cross-section to give a crown effect on the exterior is set in a groove 40 in the front 10 of the handle, the cross-section also facilitating maintaining it within the groove. One end of the band 39 is held frictionally by kinking it as at 39a into a recess 42 in the end of the handle, while the opposite end is secured by a screw 43 which threads in a hole 43a in the handle and is entered through a hole in the band. A bent leaf spring 44 is inserted between this end of the band and the handle 8 and has the screw 43 extending through a hole therein. This spring 44 continuously exerts pressure outwardly upon the band 39 so as to take up slack and keep it taut at all times within the groove 40 irrespective of expansion and contraction, and irrespective of shrinkage of the handle in the course of service. As a result the handle always has a neat appearance and the range owner never experiences any difficulty or annoyance with the band coming out of the groove and requiring a repairman to replace it.

It is believed the foregoing description conveys a good understanding of the objects and advantages of my invention. The appended claims have been drawn to cover all legitimate modifications and adaptations.

I claim:

1. A handle of elongated form having a groove provided therein extending about an exposed portion connecting opposite end portions, a band of flexible material secured at each end portion to the handle end portions and contained within the said groove, and a leaf spring fixed to one end portion of the handle between the handle and the band and arranged to spring outwardly against the inner side of the band to maintain it in a taut relation to the handle.

2. A handle of elongated form having a groove provided therein extending about an exposed portion connecting opposite end portions, a band of flexible material for ornamental filling of said groove, a bent leaf spring secured to one end portion of the handle with the adjacent end portion of the band and extending lengthwise of said end portion of the band, said spring being deflected inwardly in the application of said band under tension to the handle, seated in the groove thereof, said handle having a recess in the opposite end portion and said band having the adjacent end of said band frictionally secured therein.

3. A handle of elongated form having a groove provided therein extending about an exposed portion connecting opposite end portions, a band of flexible material for ornamental filling of said groove, a bent leaf spring secured to one end portion of the handle with the adjacent end portion of the band and extending lengthwise of said end portion of the band, said spring being deflected inwardly in the application of said band under tension to the handle, seated in the groove thereof, said handle having a recess in the opposite end portion and said band having the adjacent end of said band frictionally secured therein by kinking the end portion of the band into the recess, substantially as and for the purpose described.

4. In combination, an elongated handle of molded plastic composition material adapted to be secured to a door or drawer, the same having a narrow longitudinal groove provided therein reaching from end to end thereof, a narrow flexible metallic band adapted to fit in said groove for ornamental purposes and be secured at its ends to the handle, means for securing the ends of said band, and spring means acting against the inner side of the band at one end thereof exerting a pull in a direction away from the other end of the band, whereby to keep the band stretched resiliently.

5. In combination, an elongated handle of molded plastic composition material adapted to be secured to a door or drawer, the same having a narrow longitudinal groove provided therein reaching from end to end thereof, a narrow flexible metallic band adapted to fit in said groove for ornamental purposes and be secured at its ends to the handle, means at one end of the band for fixedly securing the same to the handle, means for frictionally securing the other end of the band to the handle after manually tensioning the band, and spring means acting between the handle and the band and arranged to be placed under load in the manual tensioning of the band and arranged thereafter to maintain tension in the band as the handle and band expand and contract relative to one another.

6. A handle of elongated form having longitudinally extending grooves provided in the back thereof on the opposite end portions, the material of said handle being relatively rigid and having a predetermined coefficient of expansion, an ornamental band of relatively flexible material having a different coefficient of expansion extending lengthwise on the outer side of said handle and having the opposite end portions thereof extending behind the handle and entered in the aforesaid grooves, means for securing the ends of said band to the end portions of said handle on the back thereof, and spring means acting against the inner side of the band at one end thereof exerting a pull in a direction away from the other end of the band to keep the band in snug engagement with the outer side of said handle.

7. An ornamental band of the character described, comprising a narrow strip of flexible material adapted to be wrapped around the exposed portion of an object to be ornamented, means for positively securing the opposite ends of said band to a non-exposed portion of said object, and spring means acting against the inner side of the band at one end thereof exerting a pull in a direction away from the other end of the band, whereby to keep the intermediate portion of the band in snug engagement with the exposed portion of said object.

8. An ornamental band of the character described, comprising a narrow strip of flexible material adapted to be wrapped around the exposed portion of an object to be ornamented, means for positively securing the opposite ends of said band to a non-exposed portion of said object, one of the end portions of the band having a hole therein to receive securing means, and a leaf spring fixed to the non-exposed portion of the object between the object and the adjacent end of the band and arranged to spring outwardly against the inner side of the band so as to exert a pull on the band in a direction away from the other end of the band to keep the intermediate portion of the band in snug engagement with the exposed portion of the object, said leaf spring having a hole in the attaching end portion thereof adapted to receive the aforesaid securing means entered through the hole in the end portion of the band.

JOHN F. HENNESSY.